United States Patent [19]
Hockney et al.

[11] Patent Number: 5,319,273
[45] Date of Patent: Jun. 7, 1994

[54] FIXED GAIN ELECTROMAGNETIC ACTUATOR AND ELECTROMAGNETIC BEARING INCORPORATING SAME

[75] Inventors: Richard L. Hockney, Lynnfield; James R. Downer, Canton; David B. Eisenhaure, Hull, all of Mass.

[73] Assignee: SatCon Technology Corporation, Cambridge, Mass.

[21] Appl. No.: 967,251

[22] Filed: Oct. 26, 1992

[51] Int. Cl.$^5$ ..................... H02K 7/09; G05D 23/275
[52] U.S. Cl. ..................................... 310/90.5; 318/632
[58] Field of Search .................. 310/90.5, 68 B; 318/632, 127, 128

[56] References Cited
U.S. PATENT DOCUMENTS

| | | | |
|---|---|---|---|
| 3,458,239 | 7/1969 | Dorsman | 310/90.5 |
| 4,000,929 | 1/1977 | Studer | 310/90.5 |
| 4,245,869 | 1/1981 | Scheffer et al. | 310/90.5 |

FOREIGN PATENT DOCUMENTS
9014525 11/1990 World Int. Prop. O.

Primary Examiner—Emanual T. Voeltz
Assistant Examiner—E. To
Attorney, Agent, or Firm—Joseph S. Iandiorio

[57] ABSTRACT

A fixed gain electromagnetic actuator for controlling the position of a body including at least two pair of a magnetically permeable pole spaced from the body, bias coils about each pole, separate control coils about each pole, a bias source for the bias coils providing a current in the bias coils producing a steady-state equal strength magnetic field on opposing sides of a body, and a control source for the control coils providing a current in the control coils for producing an increase in the magnetic field on one side of the body and a corresponding equivalent decrease in the magnetic field on the opposing side of the body to compensate for any external upsetting forces acting on the body.

17 Claims, 4 Drawing Sheets

FIXED GAIN ELECTROMAGNETIC ACTUATOR AND ELECTROMAGNETIC BEARING INCORPORATING SAME

FIELD OF INVENTION

This invention relates to an electromagnetic actuator and electromagnetic bearing in which separate bias and control means provide a fixed gain relationship between the current supplied and the force produced.

BACKGROUND OF INVENTION

Magnetic bearings are used in many applications because, unlike contact-type bearings, there is no need for lubricants which, even in sealed systems, present contamination problems. For example, in FREON compressors, oil from mechanical bearings detrimentally affects the thermal properties of FREON and hence oil separator additives and liquid accumulators are required. In oxygen-based compressors, if oil becomes mixed with oxygen, the effect can be disastrous. Overall, magnetic bearings produce less heat, are more reliable and more maintainable than mechanical bearings and hence have a longer operating life. Magnetic bearings also offer improvements in efficiency, operating speed, operating temperature, shock tolerance, and mechanical configuration over mechanical bearings. Finally, the design of mechanical bearings for extended operations in zero gravity conditions is more complicated than the design of magnetic bearings for similar applications.

Conventional radial magnetic actuators apply forces to a rotating shaft to control motion perpendicular to the spin axis of the shaft and hence act in conjunction with a control system as a radial magnetic bearing. This is generally accomplished by surrounding the shaft with a radial actuator consisting of four quadrants each containing a two pole electromagnet. Each quadrant is excited by a single current control amplifier which produces a steady bias current and the control excitation. Alternatively, permanent magnets can be used in conjunction with electromagnetic coils. The permanent magnet surrounds the circumference of the shaft and is axially polarized. On each side of the permanent magnet, electromagnetic coils are wound on poles circumferentially located about the shaft. The magnetic flux generated by the electromagnetic coils and the permanent magnet is directed radially through one pair of air gaps between the shaft and the poles.

There are limitations, however, to both of these designs. For the former, the relationship between the force on the shaft and the control currents is non-linear which produces a variable gain. Therefore, the control loop required for force control requires fairly extensive design considerations. Furthermore, controlling the net force requires controlling at least two currents: at least one current for upward force and one current for downward force. Hence, separate power amplifiers for each quadrant are required for control. In addition, the power amplifiers must continuously provide the bias current even when no force is being produced on the rotating shaft. This requires high power capacity amplifiers and results in increased amplifier losses.

In the permanent magnet system, size is the primary limitation. For small systems used in outer space applications or even in some household appliances, there is simply no room for the substantial mechanical and electromechanical structure required in radial magnetic actuators incorporating permanent magnets. For example, for one application it was found a permanent magnet biased actuator had two to four times the length of an electromagnetic biased actuator. Permanent magnets are also expensive.

SUMMARY OF INVENTION

It is therefore an object of this invention to provide an improved electromagnetic actuator.

It is a further object of this invention to provide such an electromagnetic actuator which may be used as a magnetic bearing.

It is a further object of this invention to provide such an electromagnetic actuator in which the relationship between the force on the shaft and the current used in the windings of the actuator is linear thereby providing for simpler design of the control system.

It is a further object of this invention to provide such an electromagnetic actuator in which permanent magnets are avoided and hence small size, low cost, systems are possible.

It is a further object of this invention to provide such an electromagnetic actuator which does not require a separate power amplifier to supply the bias current.

It is a further object of this invention to provide such an electromagnetic actuator in which current and force are linearly proportional.

This invention results from the realization that a fixed gain electromagnetic actuator for controlling the position of a body can be accomplished by separating the bias and control coils and interconnecting the control coils such that current supplied to the control coils produces an increase in the resultant magnetic field on one side of the body and an automatic equal decrease on the opposing side of the body thereby producing a correcting force on the body in one direction utilizing only one power amplifier and the further realization that the bias circuitry current can now be provided by a low voltage power supply.

This invention features a fixed gain electromagnetic actuator for controlling the position of a body which may be incorporated with the appropriate control devices at an electromagnetic bearing for controlling rotating shafts and the like. There are at least two pairs of opposing magnetically permeable poles spaced about the body; in a preferred embodiment there are four pairs of opposing magnetically permeable poles for controlling the position of the body in one plane. There are bias coils wound about each magnetically permeable pole and separate control coils wound about each magnetically permeable pole. A bias source connected with the bias coils provides a current in the bias coils producing steady-state equal strength magnetic fields about the poles under no load conditions. There is also a control source interconnected with the control coils for providing a current in the control coils producing an increase in the steady-state magnetic field on one side of the body and a corresponding equivalent decrease in the magnetic field on the opposing side of the body to compensate for any external upsetting forces acting on the body. For one pair of opposing magnetically permeable poles, the bias coils and the control coils are wound in the same direction; but for the opposing pair of magnetically permeable poles, the bias coils and the control coils are wound in the opposite direction. For each opposing pair of poles, both the bias coils and the control coils are connected in series. Such a winding scheme and series connection for opposing pairs of poles allows one power amplifier to control the position of the body in one direction by automatically providing a current in the control coils which produces an increase in the magnetic field on one side of the body and a corresponding equivalent decrease in the magnetic field on the opposing side of the body to compensate for any external upsetting forces acting on the body. Such a winding scheme and series connection of the bias coils allows the bias field proximate opposing pairs of poles to be produced from one power source which may be derived from a low voltage d.c. power supply supplying power to the control electronics required in a bearing incorporating the actuator of this invention. This invention also features an electromagnetic bearing incorporating the electromagnetic actuator described above. There are at least two pairs of opposing pole means spaced about a rotor, bias means for each pole means, and separate control means for each pole means. A bias source for the bias means provides a current in the bias means producing steady-state equal strength magnetic fields on opposing sides of the rotor establishing a steady-state position for the rotor with respect to the pole means. A sensor detects any displacement of the rotor relative to the steady-state position, and means responsive to the sensor correct displacement of the rotor under loading conditions. Included is a current source for the control means producing an increase in the magnetic field on one side of the rotor and an automatic corresponding equivalent decrease in the magnetic field on the opposing side of the rotor as well as means to selectively activate the current source in response to any displacement detected by the sensor means. In a preferred embodiment there are four pairs of magnetic permeable poles spaced from the rotor, each pair opposing another pair. Position sensor means detect the position of the body with respect to the poles. There are separate control and bias coils wound about each pole and the control coils and the bias coils of one opposing pair of poles are wound in the same direction, but the control coils and the bias coils of the other opposing pair of poles are wound in opposite directions. The bias coils of each two pair of opposing poles are connected in series and the control coils of each two pair of opposing poles are connected in series. There are means interconnected with the bias coils to produce a steady-state equal strength magnetic field proximate each pair of poles, as well as position controller means responsive to the position sensor means, for increasing the magnetic field proximate one pair of poles and automatically reducing the magnetic field by an equivalent amount proximate an opposing pair of poles in response to any deflection of the body with respect to the poles to provide a correcting force on the body. One power amplifier will supply the control current required for the control coils for each two pair of magnetically permeable poles, and the bias current may be supplied by the low voltage d.c. power source operating the position controller means.

DISCLOSURE OF PREFERRED EMBODIMENT

Other objects, features and advantages will occur to those skilled in the art from the following description of a preferred embodiment and the accompanying drawings, in which.

As discussed in the above Background of Invention, prior art electromagnetic actuators suffer from two interrelated limitations. Since the same coil windings provide both the no-load condition steady-state bias magnetic flux and the differential magnetic flux required to provide a correcting force on the body, separate power amplifiers must be used to control force in one direction. The result is that to control the body in one plane, four power amplifiers are required. Moreover, the power amplifiers must provide the bias current even under no-load conditions.

Figure 1:
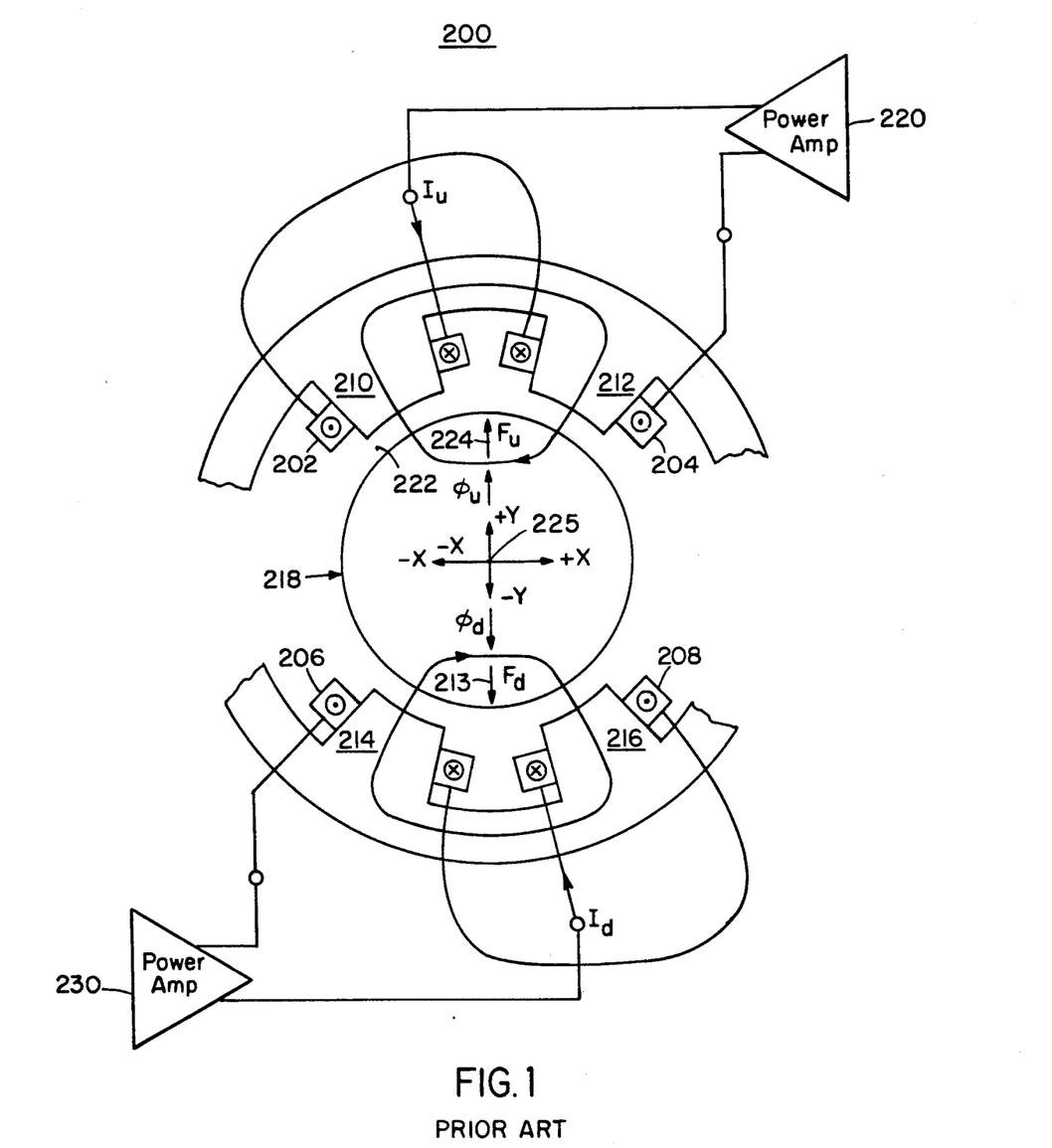
FIG. 1 is a schematic diagram of a portion of prior art radial magnetic actuator.

Hence, in prior art actuator 200, FIG. 1, there are windings 202, 204, 206, and 208 on poles 210, 212, 214, and 216 respectfully for producing a net force along one axis on body 218. Windings 202 and 204 when energized with current $I_u$ from power amplifier 220 provide magnetic flux $\phi_u$ in air gap 222 tending to attract body 218 in the $+Y$ direction denoted by arrow 224, transverse to the axis of rotation 225. The resultant force on body 218 is represented by vector $F_u$.

To provide complete control of the body along Y axis, denoted by arrow 224, force $F_d$ must also be produced in the $-Y$ direction. This is accomplished by power amplifier 230 providing current $I_d$ in windings 206 and 208 about poles 214 and 216.

Accordingly, two power amplifiers are required to produce correcting forces $F_u$ and $F_d$ along one axis; to control the rotating body in one plane, for power amplifiers would be required.

Figure 2:
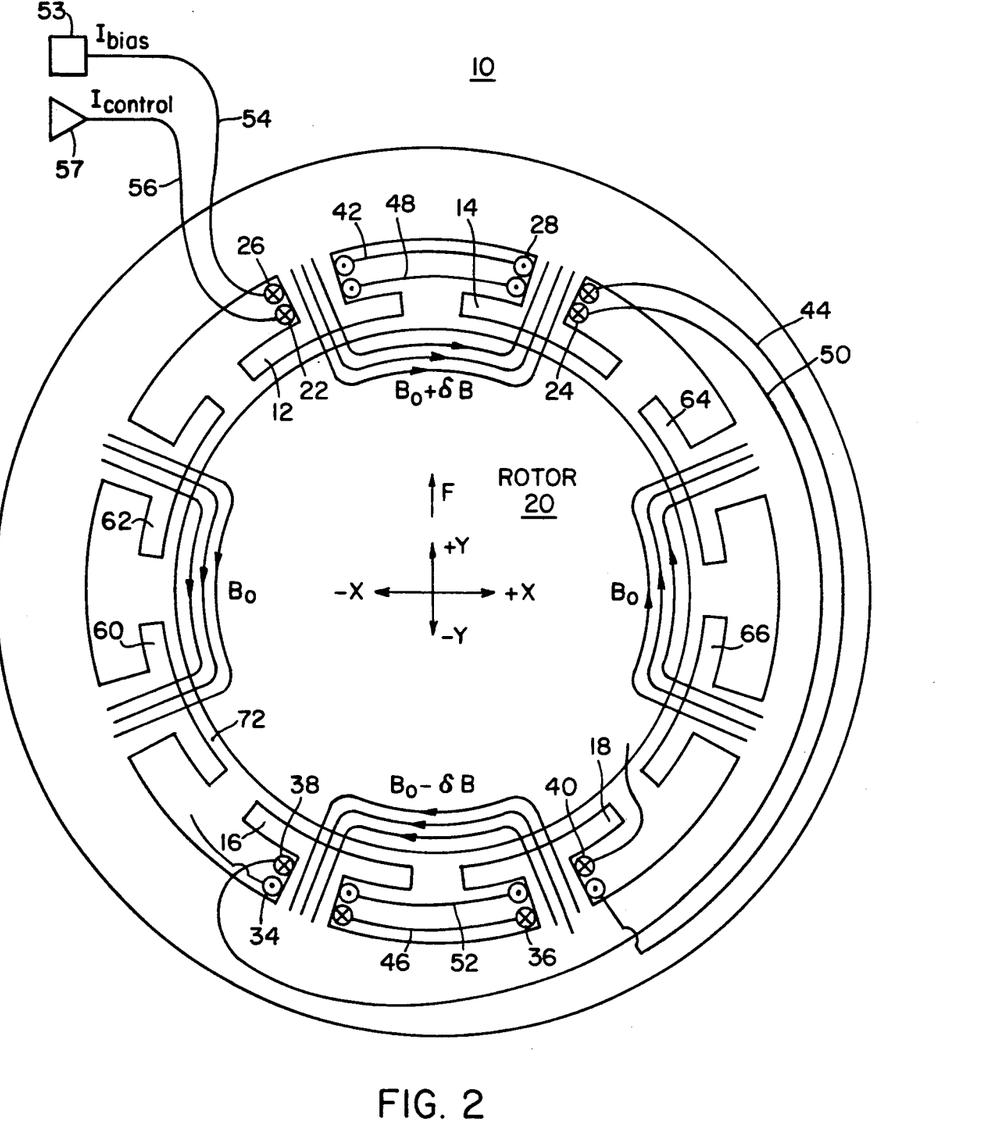
FIG. 2 is a diagrammatic cross sectional view of a fixed gain electromagnetic actuator according to the present invention.

The fixed gain electromagnetic actuator 10, FIG. 2, of this invention, however, solves both the problems associated with such prior art systems by separating the bias windings from the control windings. Only one power amplifier is required for the control current to exert forces on the body along one axis and a continuous supply of current from a power amplifier under no force condition is not required. Instead, the bias current may be supplied from a simple DC power source such as the supply for the control electronics.

There are bias coils 26 and 28 and separate control coils 22 and 24 about one pair of poles 12 and 14 respectively. There are also bias coils 34 and 36 and separate control coils 38 and 40 about opposing pair of poles 16 and 18 respectively. Bias coils 26, 28, 34, and 36, connected in series and energized by d.c. power source 53, produce magnetic field $B_o$ in air gaps 70 and 72 under steady state conditions. Control coils 22, 24, 38, and 40, connected in series and energized by power amplifier 57 provide, at air gap 70, an increase in the steady state magnetic field $B_o$ represented by $B_o+\delta B$ proximate poles 12 and 14. At the same time, a decrease in the steady state magnetic field $B_o$ represented by $B_o-\delta B$ is automatically produced proximate the opposing pair of poles 16 and 18 at air gap 72. The result is a force F acting in the $+y$ direction on body 20. To produce a force in the $-Y$ direction, the direction of current in the control coils is simply reversed.

Hence, by decoupling the bias coils from the control coils, one amplifier produces a force along one axis and only two amplifiers would be required to control the body in one plane. Moreover, the power amplifier is not energizing the bias coils under steady-state conditions and amplifier losses are minimized. A separate d.c. source of the control circuitry inherent in a bearing incorporating actuator 10 may be utilized to energize the control coils and produce steady state magnetic field $B_o$.

There may be two pairs of magnetic permeable poles 12, 14, 16 and 18 spaced about body 20 which may be a rotatable shaft used in compressors, and the like. Each pole may be separately wound with a control coil and a bias coil. For the pair comprising poles 12 and 14, control coils 22 and 24 and bias coils 26 and 28 are wound in the same direction as depicted. For the opposing pair of poles 16 and 18, however, bias coils 34 and 36 are wound in a direction opposite the winding of control coils 38 and 40. Bias coils 26, 28, 34 and 36 are connected in series as shown by lines 42, 44 and 46; and control coils 22, 24, 38 and 40 are connected in series as shown by lines 48, 50 and 52. The separation of the control coils from the bias coils and the unique winding scheme for the coils allows one power supply to produce forces on the body along one access.

The current in the bias circuit is a constant and produces a bias field represented by $B_o$. To produce a force on body 20 in the $+Y$ direction, magnetic field $B_o$ on one side of the body must be increased while the magnetic field $B_o$ on the opposite side of the body is decreased by the same amount. The increase of magnetic field $B_o$ is shown as $B_o + \delta B$ occurring at poles 12 and 14. To achieve the bias field, current is supplied to bias coils 26, 28, 36, and 34 via line 54 which may be connected to d.c. source 53 which may also control any control electronics required in a bearing incorporating actuator 10. The decrease or increase in the bias field $B_o$ is achieved in turn by current $I_{control}$ supplied to control coils 22, 24, 40, and 38 by line 56, from power amplifier 57. Hence, only one power amplifier is required instead of two in a conventional design: supplying current in line 56 increases the magnetic flux about one pair of poles and automatically decreases the magnetic flux about an opposing pair of poles by the same amount.

To achieve a force in the $-Y$ direction, the current in the control circuit of control coils 22, 24, 38 and 40 is simply reversed. To achieve a force in the $+X$ or $-X$ direction, a similar scheme for winding control and bias coils (not shown) on poles 60, 62, 64 and 66 is accomplished.

In this manner, the bias and control coils are decoupled and produce a fixed gain for the system according to this invention. Hence, only two power amplifiers are required rather than four power amplifiers required in conventional systems to control displacement in two directions. Furthermore, a power amplifier is not required to supply current under no force conditions. A simple DC power source may be used to provide the constant bias current for all bias coils 26, 28, 34 and 36 thereby reducing the power requirements over systems incorporating power amplifiers for energizing both the bias and control circuitry.

The physical forces produced by the actuator of this and prior art devices is best explained as follows:

The flux density $B_g$ in air gap 222, FIG. 1, is the magnetic flux $\phi_u$ divided by the air gap space $A_g$ or $B_g = \phi_u/A_g$. The resultant force $F_u$ on body 218 is proportional to the square of the flux density and to the air gap area:

$$F_u = \frac{B_g^2 A_g}{\mu_0} \quad (1)$$

where $\mu_0$ is the permeability of free space.

Controlling force $F_{net}$ will then be $F_u - F_d$, or $$F_{NET} = \frac{A_g}{\mu_0}(B_{gu}^2 - B_{gd}^2) \quad (2)$$

For constant air gap lengths, flux density in prior art systems is proportional to the coil current or $B_{gu} = KI_u$. Substituting this in equation (2) for $F_{net}$ yields:

$$F_N = K^2 \frac{A_g}{\mu_0}(I_u^2 - I_d^2). \quad (3)$$

Accordingly, controlling the net force on body 18 requires controlling two currents $I_u$ and $I_d$. And, since the gain between current and force is proportional to the value of the control current $I_u$, $$\text{Gain} = \frac{dF_{net}}{dI_u} = \frac{2K^2 A_g I_u}{\mu_0} \quad (4)$$

This variable gain which can be zero when no force is being applied makes design of any position control loop difficult.

This variable gain problem may be solved by operating control current $I_u$ and $I_d$ around a nominal value called bias current $I_B$ wherein $$I_U = I_B + \Delta I; \; I_D = I_B - \Delta I \quad (5)$$

The net force then becomes:

$$F_{net} = \frac{kA_g}{\mu_0}(4I_B \Delta I) \quad (6)$$

which is a constant gain between current ($\Delta I$) and force since:

$$\frac{dF_{net}}{d\Delta I} = \frac{K^2 A_g}{\mu_0}(4I_B) \quad (7)$$

Such a system, however, still requires at least two separate power amplifiers 220 and 230, FIG. 1, to provide the bias and control currents. To control the position along two axis, four power amplifiers would be required. In addition, the power amplifiers must continuously supply the bias currents even when no force is being produced. This requires higher power capacity amplifiers and results in increased amplifiers losses.

In this invention force F is proportional to the square of the flux density in air gap 70, FIG. 2, minus the square of the flux density in air gap 72. Mathematically, this means force is proportional to $(B_o + \delta B)^2 - (B_o - \delta B)^2$ or force is proportional to $(B_o)(\delta B)$ and $(I_{bias})(I_{control})$ which is a linear relationship. Accordingly, the relationship between force and control current is linear and control systems regulating $I_{control}$ are easier to design.

In a preferred embodiment there are 90 turns of no. 23 wire having a current density of approximate $2.5 \times 10^6$ A/M² for each bias coil 26, 28, 34, and 36 and for each control coil 22, 24, 38, and 40. For an air gap 70, 72 of $2.5 \times 10^{-4}$ m, a flux density of 0.8 T may be reached producing a force greater than 100 N.

Figure 3:
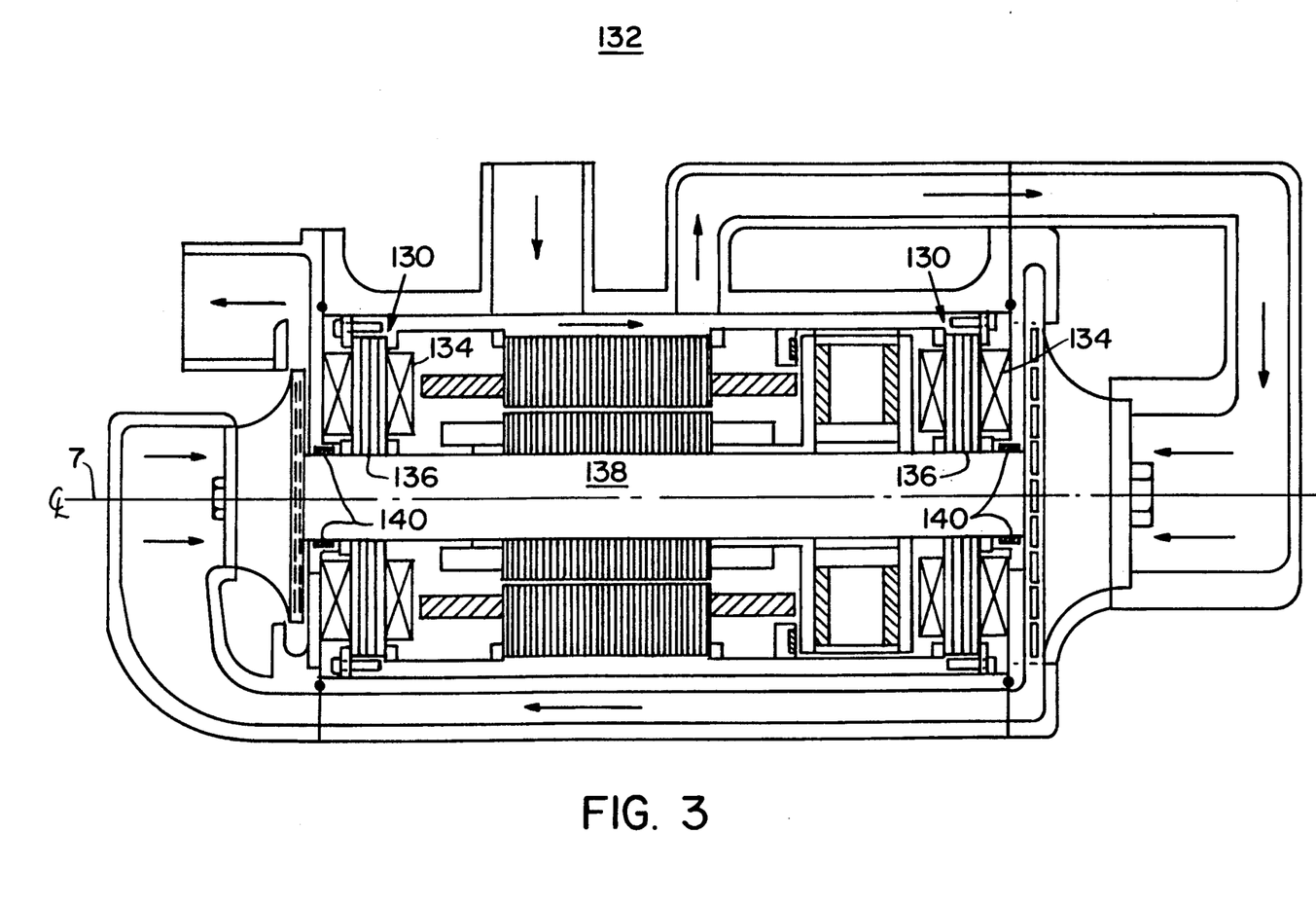
FIG. 3 is a schematic cross-sectional view of the fixed gain electromagnetic actuator of FIG. 2 incorporated as a radial magnetic bearing for controlling movement of a rotating shaft in a FREON compressor.

Incorporated as an electromagnetic bearing, 130, FIG. 3, in FREON compressor 132, actuator 10, FIG. 2, is implemented as stator 134, FIG. 3, surrounding rotor 136 attached to shaft 138. Radial sensors 140 detect displacement of rotor 136 transverse to axis of rotation 7.

Figure 4:
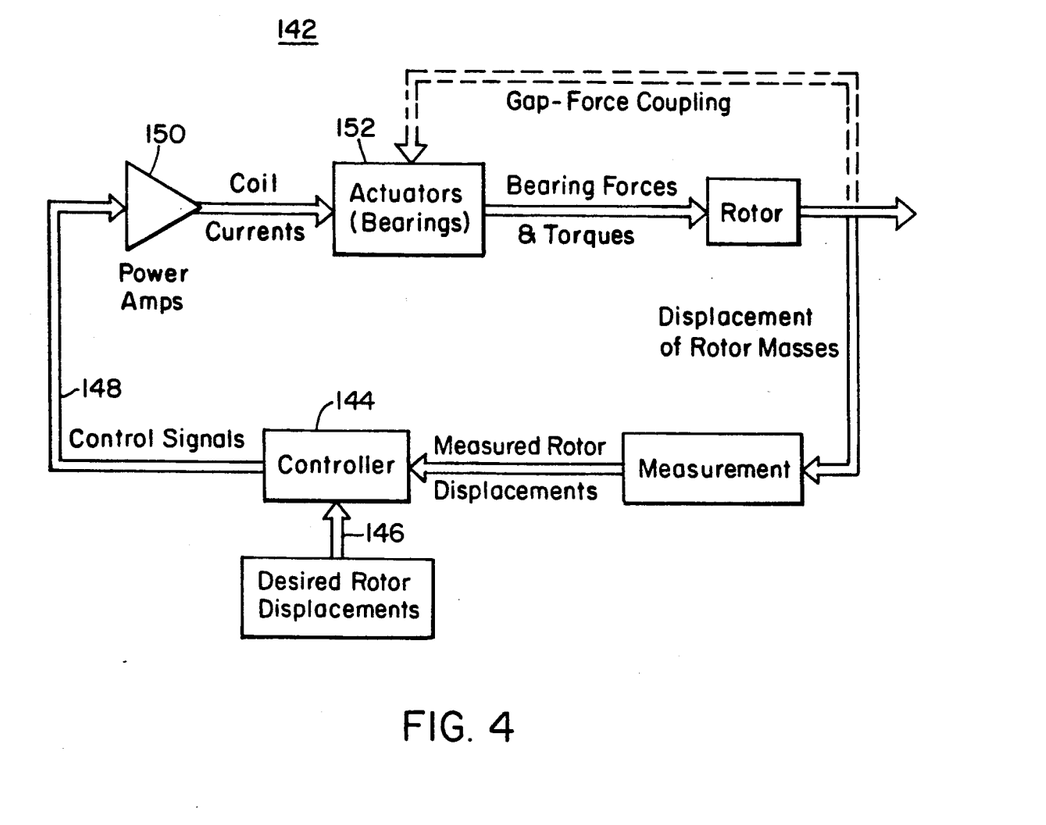
FIG. 4 is a block diagram of a control system for the bearing of FIG. 3.

Control system 142, FIG. 4, includes controller 144 responsive to the position sensors 140, FIG. 3, and the measured rotor displacements are sent to controller 144, FIG. 5 and compared with pre-established rotor displacements received by line 146. The controller signals on line 148 are amplified and converted from voltage to current via power amplifiers 150. Amplifiers 150 produce coil current that produce the attractive forces which are in turn a function of the rotor displacement as well as the control currents. Hence, the currents delivered from the power amplifies 130 control the forces generated by actuators 152.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A fixed gain electromagnetic actuator for controlling the position of a body comprising:
   at least two pairs of opposing pole means spaced from the body for defining air gaps between the actuator and the body;
   bias means for each pole means for establishing equal strength magnetic fields in the air gaps on opposing sides of the body;
   separate control means for each pole means for controlling the position of the body;
   a bias source for said bias means for providing a first current in said bias means for producing the equal strength magnetic fields in the air gaps on opposing sides of the body; and
   a control source for said control means for providing a second current in said control means producing an increase in the equal strength magnetic field on one side of the body and producing a corresponding decrease in the equal strength magnetic field on the opposing side of the body to compensate for any external upsetting forces acting on the body.

2. The fixed gain electromagnetic actuator of claim 1 in which said bias means include a coil wound about each pole means.

3. The fixed gain electromagnetic actuator of claim 2 in which said bias coils wound about each pole of each pair of poles are wound in opposite directions.

4. The fixed gain electromagnetic actuator of claim 3 in which said bias coils for opposing pairs of poles are connected in series.

5. The fixed gain electromagnetic actuator of claim 1 in which said bias source is a low voltage d.c. power supply.

6. The fixed gain electromagnetic actuator of claim 1 in which said control means include a coil wound about each pole means.

7. The fixed gain electromagnetic actuator of claim 6 in which said control coils wound about each pole of each pair of poles are wound in opposite directions.

8. The fixed gain electromagnetic actuator of claim 7 in which said control coils for opposing pairs of poles are connected in series.

9. In an electromagnetic actuator for creating a fixed gain net force on a body, the improvement comprising:
   at least two pairs of magnetic permeable poles spaced about the body defining air gaps between the actuator and the body, each pole of each pair wound with a control coil and a separate bias coil;
   the control coils and the bias coils of one said pair of poles wound in the same direction;
   the control coils and the bias coils of each opposing said pair of poles wound in opposite directions;
   said bias coils of opposing pairs of poles connected in series; and
   said control coils of opposing pairs of poles connected in series;
   a bias source for said bias coils for producing a current in the bias coils for producing equal strength magnetic fields in the air gaps on opposing sides of the body; and
   a control source for said control coils for providing a current in the control coils for producing an increase in the equal strength magnetic field on one side of the body and producing a corresponding equivalent decrease in the equal strength magnetic field on the opposing side of the body to compensate for any external forces acting on the body.

10. An electromagnetic bearing comprising:
    an actuator including at least two pairs of opposing pole means spaced about a rotor for defining air gaps between the actuator and the rotor;
    bias means for each pole means for establishing equal strength magnetic fields in the air gaps on opposing sides of the rotor;
    separate control means for each pole means for controlling the position of the rotor;
    a bias source for said bias means for providing a bias current in said bias means for producing equal strength magnetic fields in the air gaps on opposing sides of the rotor establishing a steady-state position for the rotor with respect to said pole means;
    sensor means for detecting displacement of the rotor relative to said steady-state position; and
    means, responsive to said sensor means, for correcting displacement of the rotor under loading conditions including a control current source for providing a control current in said control means producing an increase in the equal strength magnetic field on one side of the rotor and an automatic corresponding equivalent decrease in the equal strength magnetic field on the opposing side of the rotor, and means to selectively activate said current source.

11. The electromagnetic bearing at claim 10 in which said bias means include a coil wound about each pole means.

12. The electromagnetic bearing of claim 11 in which said bias coils wound about each pole of a pair of poles are wound in opposite directions.

13. The electromagnetic bearings of claim 12 in which said bias coils for opposing pairs of poles are connected in series.

14. The electromagnetic bearing of claim 10 in which said control means include a coil wound about each pole means.

15. The electromagnetic bearing of claim 14 in which said control coils wound about each pole of a pair of poles are wound opposite directions.

16. The electromagnetic bearing of claim 15 in which said control coils for opposing pairs of poles are connected in series.

17. An electromagnetic bearing for controlling the position of a body in one plane comprising:

four pairs of magnetic permeable poles spaced from the body defining air gaps between said poles and said body, each pair opposing another pair;

position sensor means for detecting the position of the body with respect to said poles;

a control coil wound about each pole and a separate bias coil wound about each pole, the control coils and the bias coils of one opposing pair of poles wound in the same direction, the control coils and bias coils of the other opposing pair of poles wound in the opposite direction;

said bias coils of each two pair of opposing poles connected in series and said control coils of each two pair of opposing poles connected in series;

a bias source interconnected with said bias coils for producing equal strength magnetic fields proximate each pair of poles;

position controller means, responsive to said position sensor means, for increasing the magnetic field proximate one pair and automatically reducing the magnetic field by an equivalent amount proximate an opposing pair of poles in response to any deflection of the body with respect to said poles to provide a correcting force on the body including a control source for said control coils comprising at least one power amplifier for each two pairs of poles for supplying a current in said control coils in an amount sufficient to compensate for any upsetting forces acting on the body.

* * * * *

UNITED STATES PATENT AND TRADEMARK OFFICE
CERTIFICATE OF CORRECTION

PATENT NO. : 5,319,273
DATED : June 7, 1994
INVENTOR(S) : Hockney et al.

It is certified that error appears in the above-indentified patent and that said Letters Patent is hereby corrected as shown below:

In column 1, line 11, insert;

"FIELD OF INVENTION":

--This invention was made with Government support under Contract No. F33615-91-C-2153, awarded by the United States Air Force. The Government has certain rights in the invention.--

Signed and Sealed this

Seventh Day of March, 1995

Attest:

BRUCE LEHMAN

Attesting Officer

Commissioner of Patents and Trademarks